United States Patent

[11] 3,543,913

| [72] | Inventor | Talat D. Itil |
| | | 2527 Rosedale, Toledo, Ohio 43606 |
| [21] | Appl. No. | 692,550 |
| [22] | Filed | Dec. 21, 1967 |
| [45] | Patented | Dec. 1, 1970 |

[54] STRUCTURAL SUPPORT ELEMENT FOR CONVEYING APPARATUS
4 Claims, 3 Drawing Figs.

[52] U.S. Cl. .................................................. 198/129, 198/204
[51] Int. Cl. ....................................................B65g 15/60, B65g 19/14
[50] Field of Search........................................ 198/204, 129, 184, 1; 302/64, 65; 138/115, 116, 117

[56] References Cited
UNITED STATES PATENTS

| 653,752 | 7/1900 | McInerney.................... | 138/116 |
| 1,930,285 | 10/1933 | Robinson....................... | 138/115 |
| 1,999,419 | 4/1935 | Mercier......................... | 198/1 |
| 2,249,588 | 7/1941 | Waddle ......................... | 198/204 |
| 2,550,725 | 5/1951 | Schultz.......................... | 138/116 |

FOREIGN PATENTS

| 509,933 | 7/1939 | Great Britain............ | 198/204 |

*Primary Examiner*—Evon C. Blunk
*Assistant Examiner*—Roger S. Gaither
*Attorneys*—Peter Vrahotes and Alfred L. Patmore, Jr.

ABSTRACT: This invention relates to structural element for conveying work and, more particularly, to the means for providing support to a conveying apparatus that moves work from one location to another. The element of this invention comprises a corrugated tube having a truss member received therein. The truss member is disposed at a generally vertical position and extends substantially the length of the corrugated tube. At each end of the tube a structural ring is secured thereto and support members, such as legs, are secured to the ring members. This combination of corrugated tube, truss member and end rings provides a structural support element having high axial, radial, and torsional strength.

Patented Dec. 1, 1970

INVENTOR.
TALAT D. ITIL

INVENTOR.

TALAT D. ITIL

STRUCTURAL SUPPORT ELEMENT FOR CONVEYING APPARATUS

In order to convey work or materials from one point to another, which points may be a distance apart horizontally as well as vertically, some type of conveying equipment is normally used. The means for supporting this conveying equipment is usually a gallery of some type within which the parts of the conveying equipment are free to move. In order to support both the conveyor and the work conveyed by the conveyor, the gallery must have enough strength to provide support to the conveyor so that a generally straight line path may be followed by the work. The galleries used for this purpose, heretofore, have been heavy and expensive structures in order to provide rigidity as well as strength. It obviously would be advantageous to have a means for supporting a conveyor that is lightweight and inexpensive.

It is, therefore, an object of this invention to provide a structural support element for a conveying apparatus of novel construction.

It is another object of this invention to provide a corrugated tube gallery as part of a support member for a conveyor.

It is further an object of this invention to provide a structural system by utilizing and combining the structural characteristics of a fabricated corrugated tube with a single conventional truss.

It is still another object of this invention to provide a conveyor of light weight and low cost that is capable of conveying work across a large distance whose ends are at different or same levels.

Other objects and advantages of the present invention will become apparent from the following description of preferred modes of carrying out the present invention, and examples thereof, and from the appended claims and accompanying drawings wherein:

Figure 1:
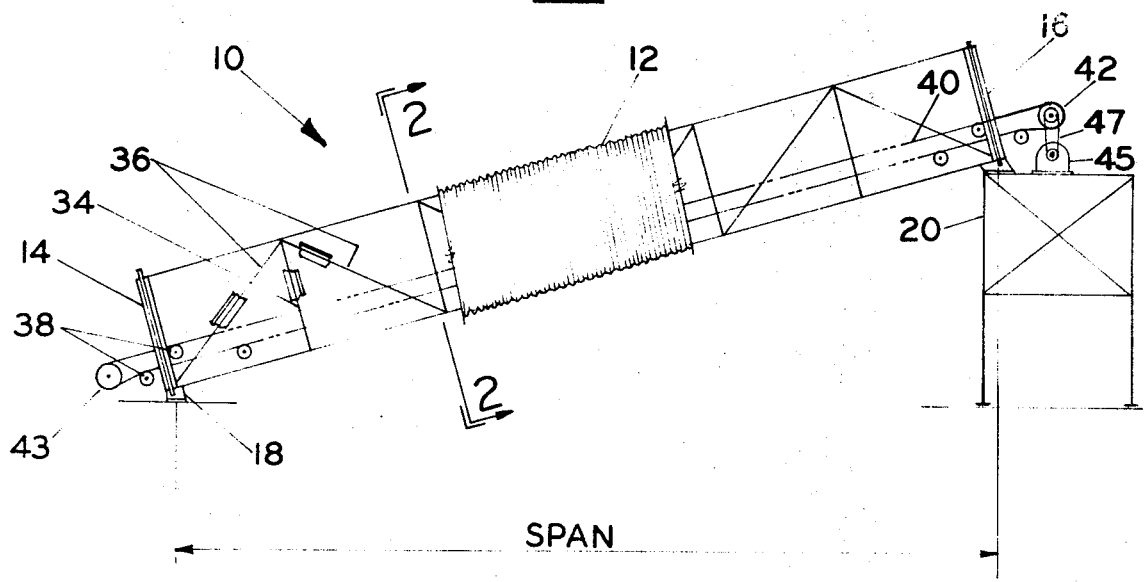
FIG. 1 is an elevational view, partially in section, of a belt type conveying apparatus that incorporates the features of this invention.

It has been found that a low cost, high strength structural element may be provided by a combination corrugated tube gallery, a truss received within the corrugated tube, and support rings secured to the ends of the tube. This element is lightweight and easily assembled and has many advantages and applications heretofore not found in prior conveying means.

Referring now to the drawing, wherein the several reference characters designate the same or like characteristics, a structural support element for conveying work is shown generally at 10. This conveyor element 10 comprises a corrugated gallery tube 12 having secured to each end thereof a pair of end rings 14 and 16, which end rings each has a support frame 18 and 20, respectively, secured thereto. One support frame 18 is shorter than the opposed frame 20 so that one end of the tube is placed at a higher level than the other.

Figure 2:
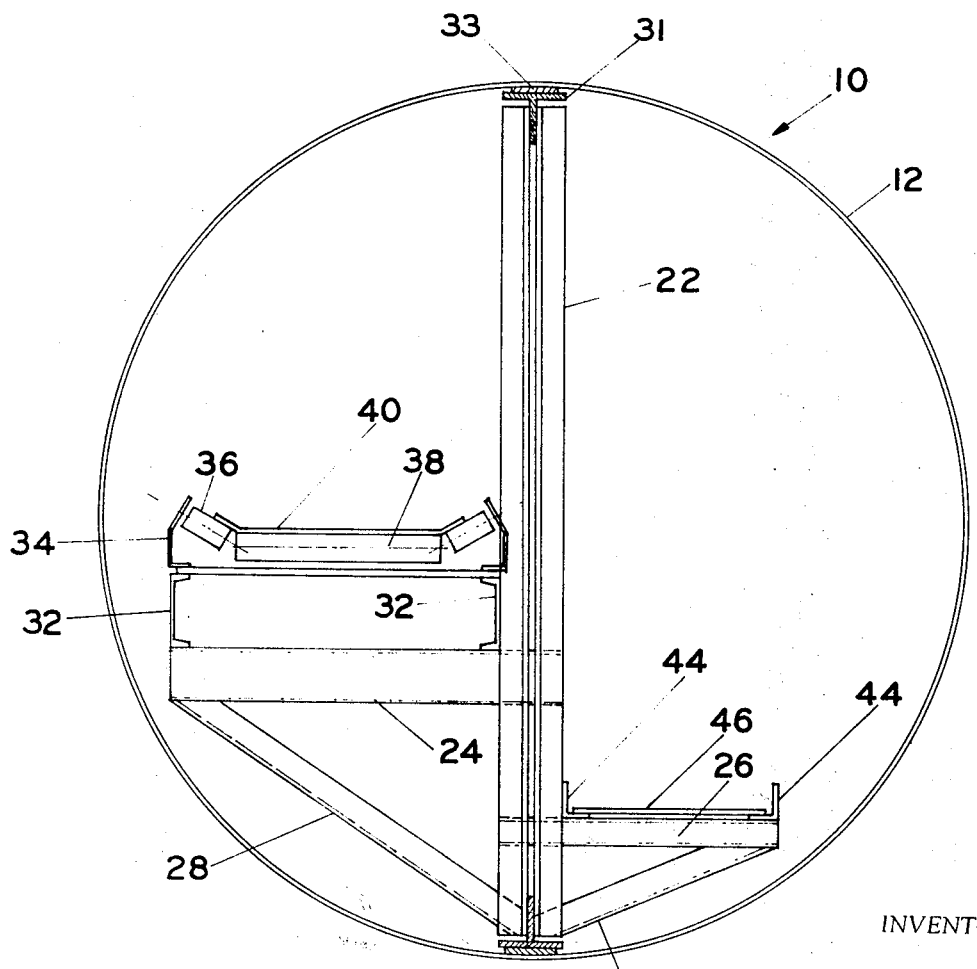
FIG. 2 is a cross-sectional view of the conveying apparatus of FIG. 1 taken along the lines 2–2.

Extending within and along the length of the tube 12 is a truss member 22 that is alined in a vertical position. The truss 22 is made of a high strength material, such as steel, and has a pair of horizontal structural members 24 and 26 extending outwardly on opposite sides thereof. These structural members 24 and 26 are supported by a pair of knee braces 28 and 30, respectively. The truss 22 has a T-beam 31 at each end thereof with a bearing plate 33 disposed between each T-beam and the corrugated tube 12. Attached to the first horizontal structural member 24 are a pair of support channels 32 that extend longitudinally within the corrugated tube 12. Supported by the channels 32 are a plurality of longitudinally spaced shaft assemblies 34, each of which rotatably carries thereon a pair of diagonal rollers 36 with an intermediate horizontal roller 38 rotatably disposed therebetween. A belt 40 is disposed upon the rollers 36 and 38 and winds around a head pulley 42 and a tail pulley 43 located externally at the opposed ends of the tube 12, the head pulley 42 being selectively rotatable by a motor 45, mounted on the frame member 20, through engagement by a drive train 47. The belt 40 is continuous and wraps around the pulleys 42 and 43 so that it is continuously carried through the tube as the rollers rotate. For convenience, only the top half of the roller belt assembly is shown in FIG. 2. The arrangement of the belt 40 conveyed upon the diagonal rollers 36 and horizontal rollers 38 allows loose material to be carried thereupon.

The second horizontal structural member 26 has a pair of support angles 44 extending longitudinally within the tube 12. These support angles receive a walkway 46 therebetween. The walkway 46 allows access to the belt 40 along the length thereof, but it is not an essential part of the apparatus.

Figure 3:
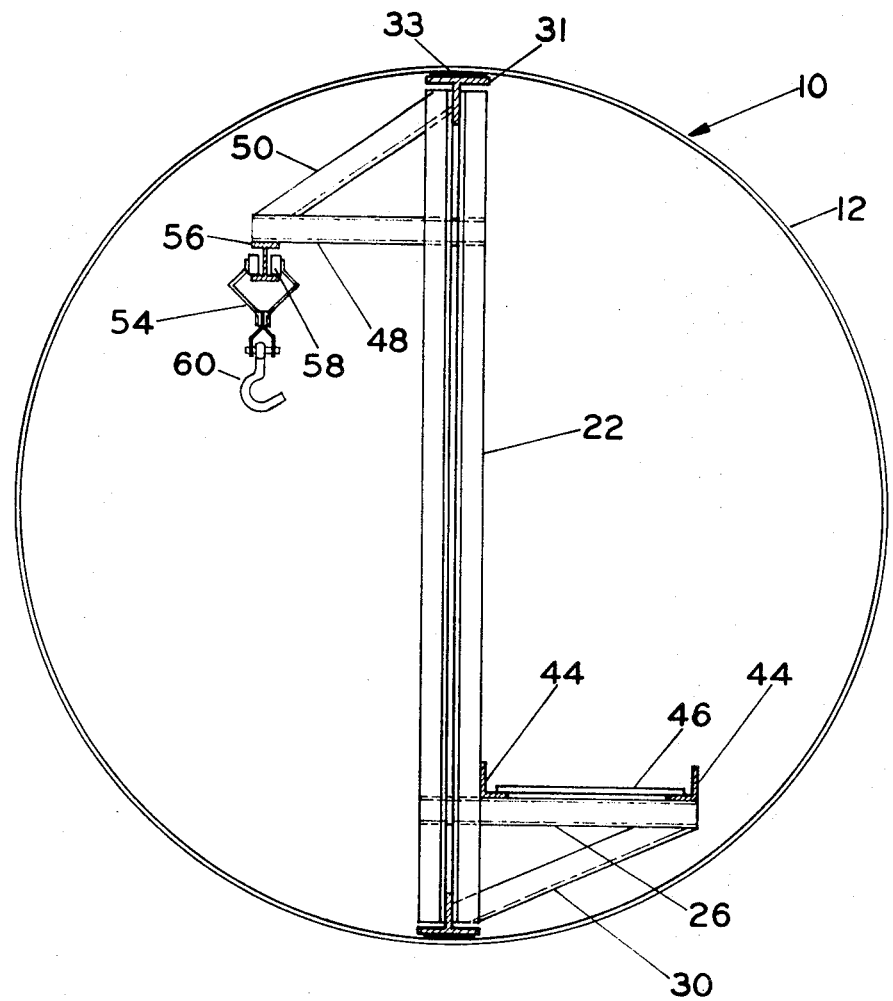
FIG. 3 is a cross-sectional view showing another embodiment of this invention also taken along the lines 2–2 of FIG. 1.

Another embodiment of this invention is shown in FIG. 3, wherein a monorail type of conveyor is shown. A horizontal structural member 48 extends laterally near the top of the truss 22 and is supported by a knee brace 50 secured to the truss. Welded to the outer end of the support member 48 is an I-beam member 56 that extends the length of the conveyor element 10. Depending from the I-beam 56 is a carrying member 54 that is supported by spaced rollers 58 received within the I-beam. The rollers 58 may be members of a chain assembly that conveys the carrying member 54 through the tube 12. The carrying member 54 may have an implement such as a hook 60 to which work is attached.

It has been found that utilizing a corrugated tube 12 as a structural member of a conveying apparatus has unusual advantages. It is well known that corrugated tubing is relatively economical, particularly when contrasted to the heavy and rigid materials that have been previously used to construct a support gallery, and the corrugations yield stiffness to the thin metal. The corrugated tube 12 was found to give lateral support and torsional strength to the truss 22 as well as weather protection to the conveyed material on the belt 40. Without the corrugated tube 12, or a similar construction, the truss 22 would not be able to carry high imposed loads, and it is also found that the corrugated tube 12 without the truss cannot support such imposed loads. The truss 22 distributes imposed loads along the entire length of the tube as opposed to other support members that have the load bearing at spaced locations along the length of the support element. All loads have to be transferred to supporting structures, such as the frame members 18 and 20 in the described embodiment. This requires heavy rings 14 and 16 at the ends of the corrugated tube 12, where it is supported, in order to obtain sufficient strength to prevent deformation of the tube.

It has been found that the strength of this corrugated tube 12, combined with a single truss 22, is such that supporting structures are not needed intermediate the ends if the length of the tube is not exceptionally great. For example, a conveying apparatus 10 was constructed with a corrugated tube gallery having a diameter of 8 feet. It was found that this structure may have a length up to approximately 120 feet without the need of support structures intermediate the ends thereof. This longitudinal, or axial, strength is particularly useful when it becomes difficult to provide support along the length of the gallery, as when it extends over a road or a body of water.

Another of the advantages found in this conveying apparatus 10 is the ability to fabricate the element within a plant as opposed to fabrication having to be performed on a job site, as is required with prior conveying apparatus. Where an extremely large conveying apparatus 10 is required, it may be made in sections in a plant with the sections assembled at the job site rather than having to fabricate the entire structure. Where extremely large lengths are required, and the element is to be made in sections, it would probably be advantageous to have a ring, such as the end ring members 12 and 14, at each section where a support member such as the frame members 18 and 20 would be required to support the span.

Although only a few embodiments of this invention have been shown and described, it is understood that changes and modifications can be made therein, and this description is illustrative only and not for the purpose of rendering this invention limited to the details illustrated or described except insofar as they are limited by the terms of the following claims.

I claim:

1. An apparatus for conveying work comprising: a tube, a truss member received within said tube and coacting therewith to provide longitudinal strength thereto, said truss extending substantially vertically along the length of said tube, a T-member and bearing plate disposed between each end of said truss member and said tube, each bearing plate engaging said tube to operatively connect said truss member and said tube, and means for conveying material longitudinally within said tube, said conveying means is supported by said truss.

2. In a conveyor, the combination comprising: a longitudinally extending tube, a truss received within said tube that extends substantially the length thereof, said truss having a height substantially equal to the diameter of said tube, a rotating member located at each end of said tube, means for driving one of said rotating members, support means secured to said truss and extending longitudinally within said tube, and a continuous belt disposed about said rotating members and supported by said support means.

3. The conveyor of a claim 2 wherein said tube is corrugated and has support rings at its ends.

4. In a conveyor for transporting articles from one location to another, the combination comprising: a longitudinally extending tube, a truss member received within said tube extending substantially the length thereof, said truss member having a height substantially equal to the diameter of said tube, support means for supporting articles to be conveyed, and conveying means operatively associated with said truss member to convey said support means from one end of said tube to the other.